US009440650B2

(12) United States Patent
Nanami (10) Patent No.: US 9,440,650 B2
(45) Date of Patent: Sep. 13, 2016

(54) COLLISION PREDICTION APPARATUS (75) Inventor: Takeshi Nanami, Gotenba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/409,980

(22) PCT Filed: Aug. 8, 2012

(86) PCT No.: PCT/JP2012/070272
§ 371 (c)(1),
(2), (4) Date: Dec. 19, 2014

(87) PCT Pub. No.: WO2014/024284
PCT Pub. Date: Feb. 13, 2014

(65) Prior Publication Data
US 2015/0183431 A1 Jul. 2, 2015

(51) Int. Cl.
B60W 30/095 (2012.01)
B60W 40/04 (2006.01)
B60R 21/01 (2006.01)

(52) U.S. Cl.
CPC ............ B60W 30/095 (2013.01); B60R 21/01 (2013.01); B60W 40/04 (2013.01); B60W 2550/302 (2013.01); B60W 2550/306 (2013.01)

(58) Field of Classification Search
CPC ...... G01S 13/72; G01S 13/726; G01S 13/93; G01S 13/931; B60W 30/095; B60W 2550/302; B60W 2550/306; G08G 1/16; G08G 1/166; G06K 9/00805
See application file for complete search history.

(56) References Cited

U.S. PATENT DOCUMENTS 4,926,171 A * 5/1990 Kelley .................... G01S 13/86
340/961
6,085,151 A * 7/2000 Farmer .................... G01S 7/023
342/70

(Continued)

FOREIGN PATENT DOCUMENTS

JP A-2001-84495 3/2001
JP A-2004-352176 12/2004

(Continued)

OTHER PUBLICATIONS

JPO machine translation of JP 2008-8679 (original JP document published Jan. 17, 2008).*

(Continued)

Primary Examiner — Behrang Badii
Assistant Examiner — David Testardi
(74) Attorney, Agent, or Firm — Oliff PLC (57) ABSTRACT A collision prediction apparatus includes a sensor that obtains positional information representing a position of a target object with respect to a host vehicle and a processing device wherein the processing device calculates a movement trajectory of the target object with respect to a vehicle, based on the positional information obtained at time points by the sensor, and the processing device predicts a probability of a collision between the target object and the vehicle, based on the calculated movement trajectory and at least one of three parameters which includes a number of obtainment time points of the positional information used to calculate the movement trajectory, a change manner of a lateral width of the target object related to the positional information between time points, and a change manner of the positional information of the target object with respect to the vehicle in a longitudinal direction of the vehicle.

5 Claims, 9 Drawing Sheets

(56) References Cited

U.S. PATENT DOCUMENTS

| | | | |
|---|---|---|---|
| 6,898,528 B2* | 5/2005 | Zorka | G08G 1/163 180/271 |
| 7,660,436 B2* | 2/2010 | Chang | G06K 9/00805 382/104 |
| 2004/0093141 A1* | 5/2004 | Rao | B60R 21/013 701/45 |
| 2004/0239490 A1 | 12/2004 | Chiba et al. | |
| 2006/0031015 A1* | 2/2006 | Paradie | G06K 9/00805 701/301 |
| 2007/0080968 A1 | 4/2007 | Kogure et al. | |
| 2009/0125237 A1* | 5/2009 | Kitagawa | B60R 21/0134 701/301 |
| 2009/0177359 A1* | 7/2009 | Ihara | B60R 21/0134 701/45 |
| 2009/0189814 A1* | 7/2009 | Moriuchi | G01S 3/48 342/451 |
| 2010/0271257 A1* | 10/2010 | Hirogari | G01S 13/726 342/107 |
| 2011/0187582 A1* | 8/2011 | Tsunekawa | G08G 1/166 342/107 |
| 2011/0285574 A1* | 11/2011 | Tsunekawa | G01S 7/40 342/70 |
| 2012/0313806 A1* | 12/2012 | Katoh | G01S 13/931 342/52 |

FOREIGN PATENT DOCUMENTS

| | | |
|---|---|---|
| JP | 2006099715 A1 * | 4/2006 |
| JP | A-2007-102639 | 4/2007 |
| JP | A-2008-8679 | 1/2008 |
| JP | A-2008-195293 | 8/2008 |
| JP | A-2008-216213 | 9/2008 |
| JP | A-2008-222164 | 9/2008 |
| JP | A-2008-302904 | 12/2008 |
| JP | A-2009-214832 | 9/2009 |
| JP | A-2010-3002 | 1/2010 |
| JP | 2010108168 A * | 5/2010 |
| JP | A-2011-113295 | 6/2011 |
| WO | WO 2010/064283 A1 | 6/2010 |

OTHER PUBLICATIONS

JPO machine translation of JP 2010-3002 (original JP document published Jan. 7, 2010).*

Sugaya, Yasuyuki et al., "Outlier Removal for Motion Tracking by Subspace Separation", 8th Symposium on Sensing via Image Information (SSII2002), Jul. 2002, Yokohama, Japan, pp. 603-608.*

* cited by examiner

COLLISION PREDICTION APPARATUS

TECHNICAL FIELD

The present invention is related to a collision prediction apparatus that predicts a probability of a collision between a target object and a host vehicle.

BACKGROUND ART

A collision prediction apparatus is known which predicts a relative movement trajectory of a target object that can be an obstacle with respect to a host vehicle, and predicts a probability of a collision between the target object and the host vehicle (see Patent Document 1). According to the collision prediction apparatus, positions of the target object are detected constantly by a radar, and an approximate line (or an approximate curve) for the detected positions is calculated with a RANSAC algorithm or a least squares method, etc. The movement trajectory is predicted based on the approximate line.

[Patent Document 1] Japanese Laid-open Patent Publication No. 2004-352176

DISCLOSURE OF INVENTION

Problem to be Solved by Invention

However, according to the configuration disclosed in Patent Document 1, because the positions detected by the radar are handled equally, there is a problem that prediction accuracy is reduced due to the positional information (detection point) whose reliability level is low.

An object of the present invention is to provide a collision prediction apparatus that can predict a probability of a collision between a target object and a host vehicle with high accuracy.

Means to Solve the Problem

According to one aspect of the invention, a collision prediction apparatus is provided, which comprises:
a sensor that obtains positional information representing a position of a target object with respect to a host vehicle; and
a processing device; wherein
the processing device calculates a movement trajectory of the target object with respect to the host vehicle, based on the positional information obtained at a plurality of time points by the sensor, and
the processing device predicts a probability of a collision between the target object and the host vehicle, based on the calculated movement trajectory and at least one of three parameters, wherein the three parameters includes a number of obtainment time points of the positional information used to calculate the movement trajectory, a change manner of a lateral width of the target object related to the positional information between the time points, and a change manner of the positional information of the target object with respect to the host vehicle in a longitudinal direction of the host vehicle.

Advantage of the Invention

According to the present invention, a collision prediction apparatus can be obtained which can predict a probability of a collision between a target object and a host vehicle with high accuracy.

DESCRIPTION OF REFERENCE SYMBOLS

10 processing device
20 radar sensor
30 image sensor
40 vehicle sensor
50 throttle control device
52 brake control device
54 display device
56 buzzer

BEST MODE FOR CARRYING OUT THE INVENTION

In the following, the best mode for carrying out the present invention will be described in detail by referring to the accompanying drawings.

Figure 1:
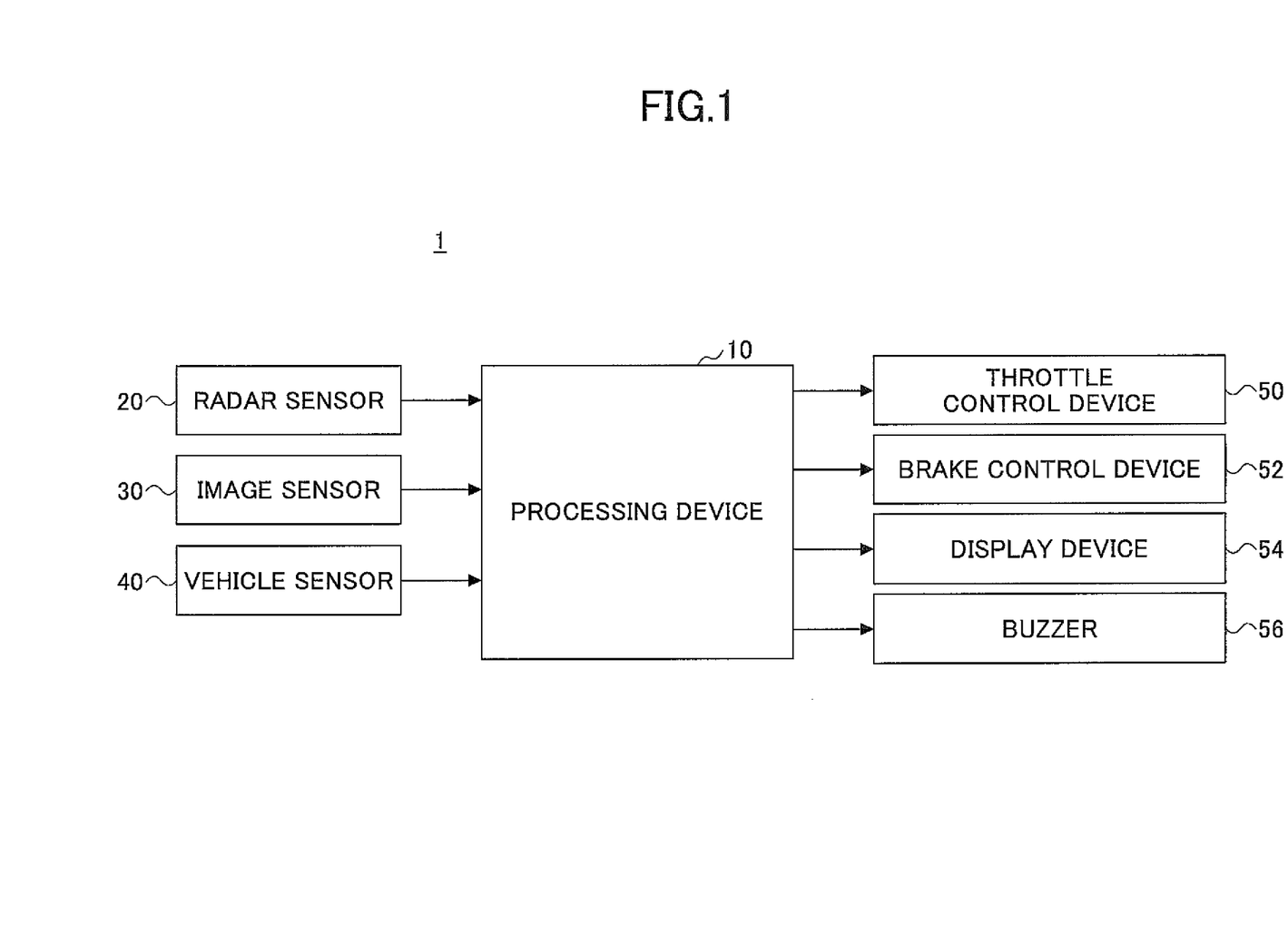
FIG. 1 is a diagram for illustrating a main configuration of a collision prediction apparatus 1 according to an embodiment.

FIG. 1 is a diagram for illustrating a main configuration of a collision prediction apparatus 1 according to an embodiment. The collision prediction apparatus 1 is installed on a vehicle. The collision prediction apparatus 1 includes a processing device 10.

The processing device 10 may be configured by a processor including a CPU. The respective functions of the processing device 10 (including functions described hereinafter) may be implemented by any hardware, any software, any firmware or any combination thereof. For example, any part of or all the functions of the processing device 10 may be implemented by an ASIC (application-specific integrated circuit), a FPGA (Field Programmable Gate Array) or a DSP (digital signal processor). Further, the processing device 10 may be implemented by a plurality of processing devices. It is noted that, typically, the processing device 10 is implemented in a form of an ECU (electronic control unit).

The processing device 10 is connected to a radar sensor 20 and an image sensor 30 that are examples of a sensor that obtains positional information of a target object with respect to the host vehicle. It is noted that only one of the radar sensor 20 and the image sensor 30 may be used.

The radar sensor 20 detects a state (preceding vehicle information) of the target object in front of a host vehicle using an electric wave (millimeter wave, for example), a light wave (laser, for example) or a ultrasonic wave as a detection wave. The target object is an arbitrary object that could be an obstacle with respect to the host vehicle, that is to say, an arbitrary object for which the collision of the host vehicle is to be prevented. The target object may be other vehicles, pedestrians, stationary objects, etc., for example. The radar sensor 20 detects information that represents a relationship between the target object and the host vehicle, positional information of the target object, for example, at a predetermined cycle. The positional information (detection result) of the target object may be transmitted to the processing device 10 at a predetermined cycle. It is noted that any functions of the radar sensor 20 (a function of calculating the position of the target object, for example) may be implemented by the processing device 10.

The image sensor 30 includes a camera, which includes imaging elements such as CCDs (charge-coupled device), CMOSs (complementary metal oxide semiconductor), etc., and an image processor to recognize the state of the target object in front of the host vehicle. The image sensor 30 may be of a stereo type or include two or more cameras that are provided in different manners. The image sensor 30 detects, based on an image recognition result, the information which represents a relationship between the target object and the host vehicle such as positional information of the target object with respect to the host vehicle, for example, at a predetermined cycle. The positional information of the target object includes information related to the position (distance) of the target object in the back-and-forth direction of the host vehicle, and/or information related to the lateral position of the target object in the lateral direction (width direction) of the host vehicle. The lateral position of the target object may be calculated based on a center position of a pixel group related to the target object in the lateral direction. Alternatively, the lateral position of the target object may be calculated as a range between a left end lateral position and a right end lateral position. Further, the image sensor 30 obtains information related to the lateral width of the target object based on the image recognition result, if necessary. The information (detection result) obtained by the image sensor 30 may be transmitted to the processing device 10 at a predetermined frame cycle. It is noted that the image processing function of the image processor (a function of calculating the position and the lateral width of the target object, for example) may be implemented by the processing device 10.

If the image sensor 30 is of a stereo type, image data (stereo image data) obtained by the two camera is subject to a stereo matching process after an edge detection process. According to the stereo matching process, a SAD (Sum of Absolute Differences) calculation is performed using the image from one of the cameras as reference image, for example, to generate a parallax image based on a SAD wave shape. Then, pixels that have substantially the same parallax may be categorized as the same group, and the categorized pixel group may be recognized as a pixel group related to the target object. Alternatively, the pattern matching may be performed for the pixels that have substantially the same parallax, and the pixel group that matches a master pattern may be recognized as a pixel group related to the target object. In any case, the lateral width of the target object may be calculated by converting the lateral width (in a left and right direction) of the image group related to the target object into a width in real space.

If the radar sensor 20 and the image sensor 30 are used, the positional information from the radar sensor 20 and the positional information from the 30 may be used in combination, if necessary. For example, the positional information and the speed information of the target object related to the position (distance) in the back-and-forth direction of the host vehicle may be obtained by the radar sensor 20, while the position (lateral position) information related to a lateral direction of the host vehicle and the information (lateral width information) related to the lateral width of the target object may be obtained by the image sensor 30.

The processing device 10 may be connected to vehicle sensors 40 that obtain vehicle information. The vehicle sensors 40 may include vehicle speed sensors (vehicle wheel speed sensors) for detecting the vehicle speed.

The processing device 10 is connected to, as examples of control target devices, a throttle control device (an engine ECU, for example) 50, a brake control device (a brake ECU, for example) 52, a display device 54 and a buzzer 56.

The throttle control device 50 adjusts an output of the engine by controlling a throttle position according to an instruction from the processing device 10. For example, the processing device 10 may reduce the output of the engine via the throttle control device 50 when the processing device 10 determines that the collision between the host vehicle and the target object is inevitable.

The brake control device 52 adjusts a brake force (wheel cylinder pressures) by controlling a brake actuator and/or valves according to an instruction from the processing device 10. For example, the processing device 10 may automatically generate the brake force via the brake control device 52 when the processing device 10 determines that the collision between the host vehicle and the target object is inevitable.

The display device 54 displays an alert according to an instruction from the processing device 10. The alert may be related to the collision between the host vehicle and the target object. It is noted that the display device 54 may be directly controlled by the processing device 10, or may be controlled by the processing device 10 via another controller.

The buzzer 56 sounds an alert sound according to an instruction from the processing device 10. The alert sound may be related to the collision between the host vehicle and the target object. It is noted that the buzzer 56 may be directly controlled by the processing device 10, or may be controlled by the processing device 10 via another controller.

It is noted that the control target devices may include other protection devices such as a device that changes a position of a bumper in up and down directions and front and back directions, a seat belt pre-tensioner that winds up a seat belt by a predetermined amount if it is determined that the collision between the host vehicle and the target object is inevitable.

Figure 2:
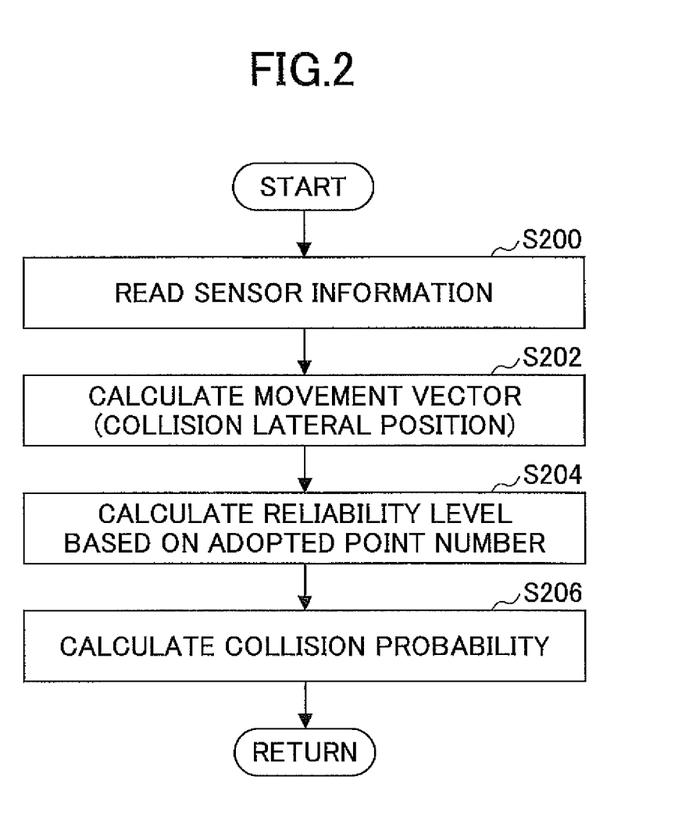
FIG. 2 is an example (first embodiment) of a flowchart of a main process executed by the collision prediction apparatus 1.

FIG. 2 is an example (first embodiment) of a flowchart of a main process executed by the collision prediction apparatus 1. It is noted that the process illustrated in FIG. 2 is performed by the processing device 10; however, a part of the processes (a process of step S202, etc., for example) may be performed by processing devices in the radar sensor 20 and/or the image sensor 30. In this case, processing devices in the radar sensor 20 and/or the image sensor 30 form a part of the processing device 10. The process routine illustrated in FIG. 2 is performed at a predetermined cycle during a period in which the vehicle travels, for example.

In step S200, sensor information (positional information of the target object) from the radar sensor 20 and/or the image sensor 30 is read.

In step S202, a movement vector of the target object with respect to the host vehicle (simply referred to as "a movement vector", hereinafter) is calculated based on the positional information of the target object read in step S200. At that time, a collision lateral position may be calculated based on the calculated movement vector. The collision lateral position represents a position of a front part of the host vehicle to which the target object hits in the case of the collision between the target object and the host vehicle. Specifically, the collision lateral position corresponds to an intersection between an extended line of the movement vector and a horizontal line tangent to the front part of the host vehicle (i.e., an intersection, if the movement vector and the front part of the host vehicle are intersected when the movement vector is extended). Here, in order to calculate the movement vector, the positional information of the target object read in step S200 includes positional information at a plurality of time points. In other words, the positional information of the target object read in step S200 represents a change history of the position of the target object with respect to the host vehicle. A way of calculating the movement vector at a plurality of time points may be arbitrary, including an ordinary least squares method; however, preferably, a robust estimation method that uses only, part of the positional information at a plurality of time points that is within a predetermined error range. A typical example of the robust estimation method is RANSAC (RANdom SAmple Consensus)algorithm that randomly extracts samples of the positional information items and applies the least squares method to the extracted samples. Here, as a preferable example, the explanation is made, assuming that the movement vector is calculated with the RANSAC algorithm.

In step S204, a reliability level related to the movement vector calculated in step S202 is calculated based on the number (adopted point number) of the positional information items of the target object adopted in calculating the movement vector in step S202. According to the RANSAC algorithm (and also other robust estimation methods), the positional information items that are out of the predetermined error range is not adopted as outliers. Thus, the adopted point number corresponds to the number of the positional information items of the target object (i.e., the number of the time points) that are used (adopted) in calculating the movement vector.

The reliability level may be calculated such that the more the adopted point number becomes, the higher the reliability level becomes. In other words, the reliability level may be calculated such that the less the adopted point number becomes, the lower the reliability level becomes. For example, the reliability level is 100 (maximum value) if the adopted point number corresponds to a maximum point number (or greater than or equal to a predetermined reference number), 40 if the adopted point number is "2", and so on. This is because there may be a case where even the RANSAC algorithm cannot perform a linear approximation (line fitting) with high accuracy if the adopted point number is small. The reliability level may be calculated such that it decreases linearly with respect to the decrease of the adopted point number, or such that it decreases nonlinearly (step wise manner) with respect to the decrease of the adopted point number.

In step S206, a collision probability is calculated based on the movement vector calculated in step S202 and the reliability level calculated in step S204. A way of calculating the collision probability may be arbitrary. For example, when the movement vector calculated in step S202 has a direction to the host vehicle, the collision probability may be calculated such that the higher the reliability level calculated in step S204 is (i.e., the more the adopted point number is), the higher the collision probability becomes. Another example of the way of calculating the collision probability is described hereinafter (see FIG. 4). The collision probability thus calculated is compared with a predetermined threshold, and when the collision probability exceeds the predetermined threshold, the brake control device 52, etc., may be operated as described above. Further, the collision probability thus calculated may be summed with collision probabilities at the latest time points to derive the accumulated value of the collision probabilities (see FIG. 4). In this case, if the accumulated value of the collision probabilities exceeds a predetermined threshold, the brake control device 52, etc., may be operated as described above.

Figure 3:
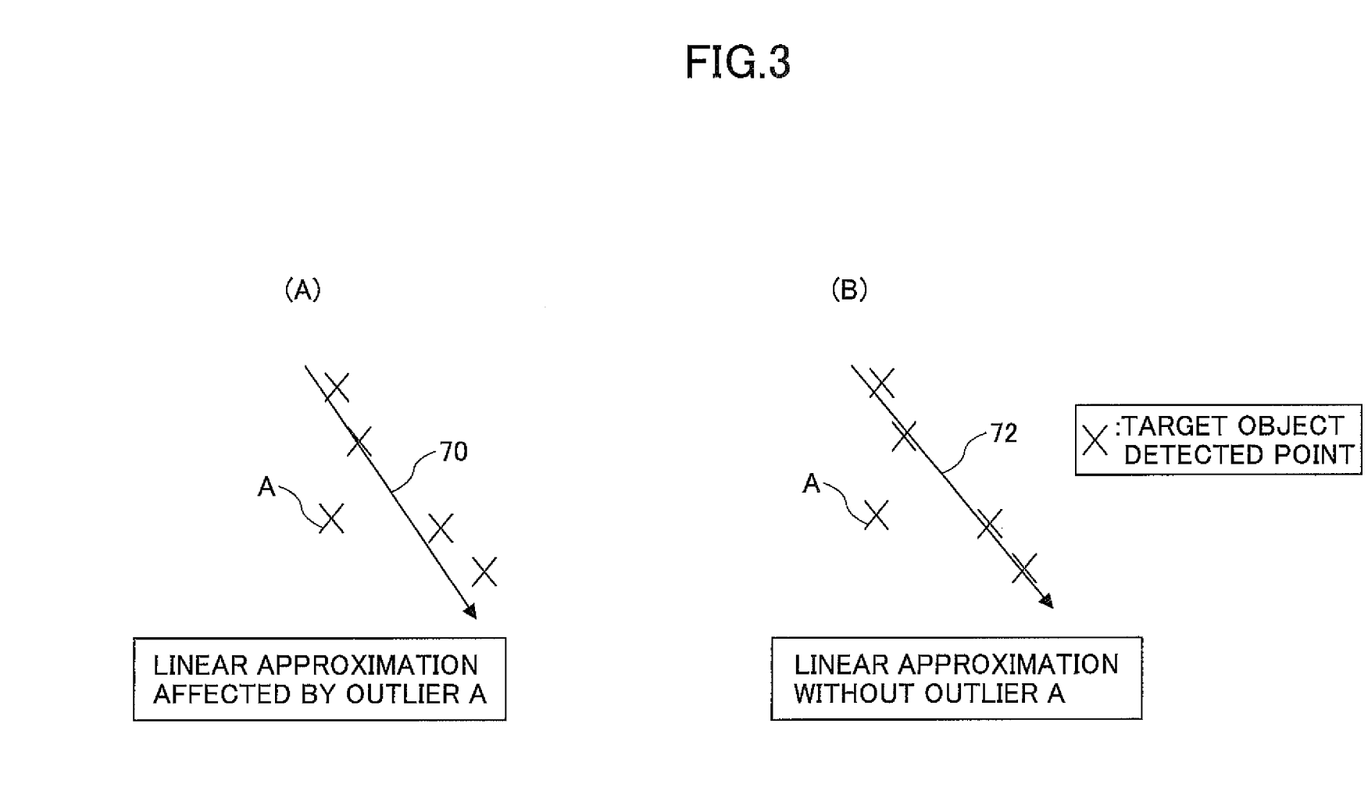
FIG. 3 is a diagram for explaining a RANSAC algorithm in contrast with an ordinary least squares method.

FIG. 3 is a diagram for explaining the RANSAC algorithm in contrast with the ordinary least squares method in connection with the process of step S202 illustrated in FIG. 2. FIG. 3 (A) schematically illustrates the movement vector 70 obtained by the linear approximation with the ordinary least squares method, and FIG. 3 (B) schematically illustrates the movement vector 72 obtained by the linear approximation with the RANSAC algorithm. In FIG. 3, marks "X" represent target object detected points at the respective time points. The target object detected point represents a point of the position of the target object, which may be expressed by the distance and the lateral position of the target object with respect to the host vehicle. The target object detected points (positional information of the target object) at a plurality of time points may be information of sequential point data in time series, as illustrated in FIG. 3. It is noted that, in the illustrated example, the target object detected points are illustrated in a relative coordinate system (relative positions) with respect to the host vehicle; however, the target object detected points may be obtained and processed in an absolute coordinate system.

In the case of the linear approximation with the ordinary least squares method, as schematically illustrated in FIG. 3 (A), the linear approximation is affected by the outlier A. In contrast, in the case of the linear approximation with the RANSAC algorithm, as schematically illustrated in FIG. 3 (B), the linear approximation with high accuracy can be implemented without being affected by the outlier A, because the linear approximation is performed without the outlier A. On the other hand, in the case of the linear approximation with the RANSAC algorithm, there may be a case where the linear approximation cannot be implemented with high accuracy when the adopted point number is small due to the large number of the outliers, for example. In such a case, there is a risk that a high collision probability is calculated based on the movement vector obtained by the linear approximation with the RANSAC algorithm, regardless of the fact that the actual collision probability is low.

In contrast, according to the process illustrated in FIG. 2, the collision probability is calculated based on not only the movement vector obtained by the linear approximation with the RANSAC algorithm but also the reliability level (i.e., the reliability level based on the adopted point number) related to the calculated movement vector, which enables calculating the collision probability that is adapted more to the actual collision probability.

It is noted that, in the example illustrated in FIG. 3, the target object detected point at each time point is a single point; however, this point may be a particular point, among a group of the target object detected points (related to the same target object) obtained at that time point. For example, the particular point may be a center of the group of the target object detected points (a center in a left and right direction, for example). Further, in order to consider the lateral width of the target object, left ends of groups of the target object detected points at a plurality of time points may be linearly approximated with the RANSAC algorithm to obtain the movement vector, and right ends of groups of the target object detected points at a plurality of time points may be linearly approximated with the RANSAC algorithm to obtain the movement vector. In this case, three movement vectors are calculated. In this case, the reliability level based on the adopted point number may be an average of the reliability levels obtained each for the three movement vectors or a combined value obtained by assigning predetermined weights to the reliability levels.

Figure 4:
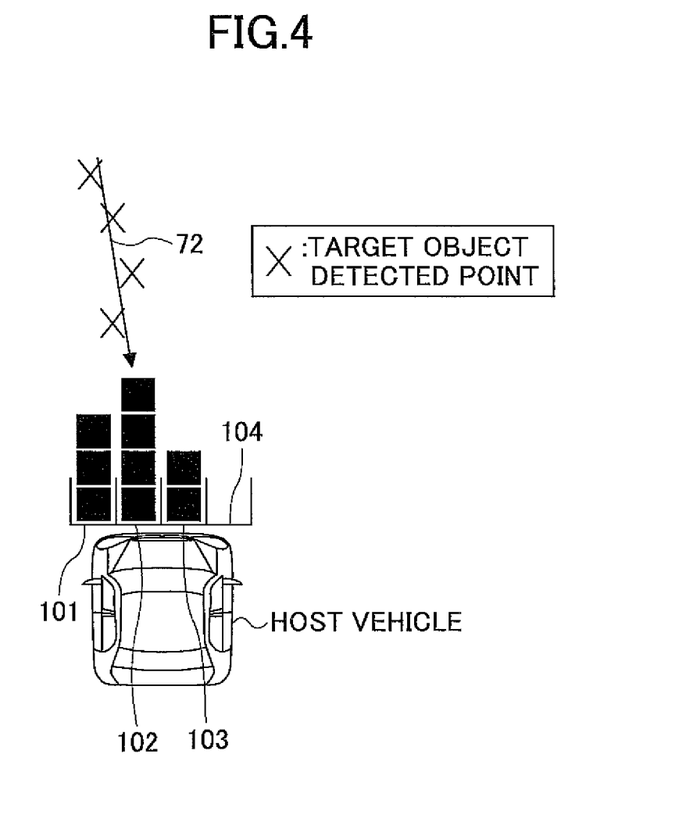
FIG. 4 is a diagram for explaining an example of a collision inevitable situation determination algorithm together with an example of the collision probability calculation algorithm.

FIG. 4 is a diagram for explaining an example of a collision inevitable situation determination algorithm together with an example of a collision probability calculation algorithm. In FIG. 4, the movement vector 72 that is explained with reference to FIG. 3 is illustrated together with the host vehicle.

In FIG. 4, four voting boxes 101, 102, 103 and 104 are schematically illustrated in front of the host vehicle. The voting boxes 101, 102, 103 and 104 are imaginarily set to correspond to the respective portion (sections) when the front part of the host vehicle is divided in the lateral direction. The number of the voting boxes may be arbitrary (four, in this example). Further, the lateral width of the respective portions of the front part of the host vehicle (i.e., the lateral width of the respective portions corresponding to the voting boxes) may be the same, or may be different between the portions. Further, the voting boxes may be provided in two stages in the front and back direction of the host vehicle.

In the example illustrated in FIG. 4, the collision probability is calculated for each portion of the front part of the host vehicle. In this example, the collision probability is calculated for each portion of the front part of the host vehicle such that its maximum value is 10% at a predetermined cycle (at a process cycle of the process illustrated in FIG. 2, for example). The collision probabilities calculated for the portions of the front part of the host vehicle are voted in the corresponding voting boxes 101, 102, 103 and 104, and the accumulated values of the collision probabilities for ten times (the latest ten times) are evaluated. In other words, the accumulated values of the collision probabilities of the latest ten time points are evaluated. The collision probability at a certain time point may be calculated based on the movement vector and the reliability level. Specifically, a portion, among the respective portions of the front part of the host vehicle, in which the collision lateral position calculated based on the movement vector as described above is located, is determined, and the probability, at most 10%, is assigned to the voting box corresponding to the portion in which the collision lateral position is located. At that time, the reliability level may be considered such that the collision probability at that time point is multiplied by the reliability level at that time point. For example, if the reliability level at that time point is the maximum value (100, for example), the maximum probability 10% (10%×1) is assigned to the voting box corresponding to the portion in which the collision lateral position is located. On the other hand, if the reliability level at that time point is the minimum value (0, for example), the probability 0% (10%×0), instead of the maximum probability 10%, may be assigned to the voting box corresponding to the portion in which the collision lateral position is located. It is noted that the reliability levels at the respective time points may be reflected for the collision probabilities at the corresponding time points; however, an average of the reliability levels at the respective time points may be reflected for the accumulated value of the collision probabilities.

It is noted that the collision lateral position may be defined to have such a range that corresponds to the lateral width of the target object and is centered based on the movement vector, for example. In this case, the lateral width of the target object may be based on the lateral width information at that time point, or an average of the lateral widths of the lateral width information at the latest time points. In any case, there may be a plurality of voting boxes in which the collision lateral position defined to have the range is located. Further, similarly, in order to consider the lateral width of the target object, if a plurality of the movement vectors are calculated as described above, the collision lateral position (range) may be determined based on the respective movement vectors.

It is noted that, in the example illustrated in FIG. 4, a state in which the collision probabilities calculated at four time points have been voted. With respect to the voting box 101, the collision probabilities greater than 0 have been voted in three time points. With respect to the voting box 102, the collision probabilities greater than 0 have been voted in four time points. With respect to the voting box 103, the collision probabilities greater than 0 have been voted in two time points. With respect to the voting box 104, no collision probability greater than 0 has been voted. For example, with respect to the voting box 102, if the collision probabilities of 10% have been voted in four time points (assuming that the collision probabilities at the previous 6 time points immediately before these four time points are 0%), the accumulated value of the collision probabilities for the voting box 102 is 40%.

A way of evaluating the accumulated value of the collision probabilities (i.e., a collision inevitable situation determination method based on the accumulated value of the collision probabilities) may be arbitrary. For example, the accumulated value of the collision probabilities may be compared with a predetermined threshold on a voting box basis for the voting boxes 101, 102, 103 and 104. The predetermined threshold may be prepared on a voting box basis for the voting boxes 101, 102, 103 and 104. In other words, the predetermined threshold may be set for each portion of the front part of the host vehicle. In this case, the predetermined thresholds may be set such that the predetermined threshold for the portion on a center side of the vehicle in the lateral direction is lower than that for the portion on an end side of the vehicle in the lateral direction. For example, with respect to the voting boxes 101 and 104 on the end side of the vehicle, a threshold (70%, for example) that is greater than that (45%, for example) of the voting boxes 102 and 103 on the center side of the vehicle may be set. The accumulated values of the collision probabilities may be compared with predetermined thresholds on a voting box basis for the voting boxes 101, 102, 103 and 104, and if the accumulated value of the collision probabilities at any one of the voting box exceeds the predetermined threshold, it may be determined that the collision of the target object into the portion related to that voting box is inevitable. In this way, according to the way of calculating the collision probabilities for the respective portions of the front part of the host vehicle, it becomes possible to evaluate, with high accuracy, the probability of the collision between the target object and the host vehicle on a portion basis for the respective portions of the front part of the host vehicle.

Figure 5:
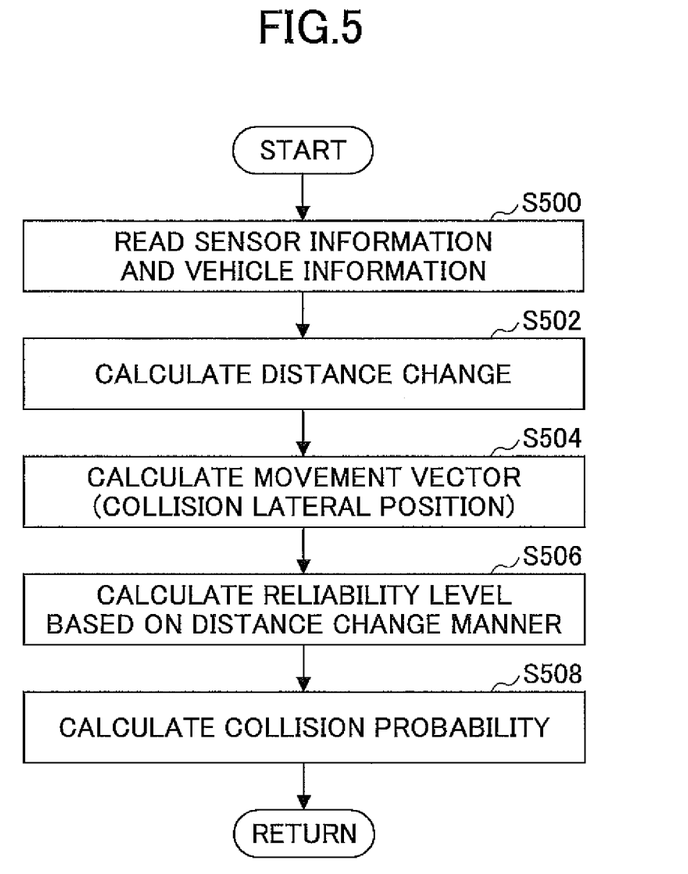
FIG. 5 is an example (second embodiment) of a flowchart of a main process executed by the collision prediction apparatus 1.

FIG. 5 is an example (second embodiment) of a flowchart of a main process executed by the collision prediction apparatus 1. It is noted that the process illustrated in FIG. 5 is performed by the processing device 10; however, a part of the processes (a process of step S504, etc., for example) may be performed by processing devices in the radar sensor 20 and/or the image sensor 30. In this case, processing devices in the radar sensor 20 and/or the image sensor 30 form a part of the processing device 10. The process routine illustrated in FIG. 5 is performed at a predetermined cycle during a period in which the vehicle travels, for example. The process illustrated in FIG. 5 is suited, in particular, for a case where the target object is a stationary object.

In step S500, sensor information (positional information of the target object) from the radar sensor 20 and/or the image sensor 30 is read. Further, the vehicle information from the vehicle sensor 40, in addition to the sensor information from the radar sensor 20 and/or the image sensor 30, is read.

In step S502, a differential in the position of the target object with respect to the host vehicle is calculated based on the positional information of the target object at the current cycle and the positional information of the target object at the previous cycle, and a change rate of the position (distance) of the target object from the vehicle speed of the host vehicle is calculated based on the vehicle information (vehicle speed information of the host vehicle) from the vehicle sensor 40. The differential between the current value and the previous value of the position (distance) of the target object with respect to the host vehicle may be a differential (change rate of the distance) related to the front and back direction of the host vehicle. The change rate of the position of the target object from the vehicle speed of the host vehicle may be calculated by multiplying the speed of the host vehicle by a calculation cycle (obtainment cycle of the positional information of the target object). It is noted that, in the case where the target object is a stationary object (alternatively, the target object moves only in the lateral direction and thus is stationary in the front and back direction), the differential between the current value and the previous value of the position of the target object with respect to the host vehicle is expected to correspond to the change rate of the position of the target object from the vehicle speed of the host vehicle.

In step S504, the movement vector (and the collision lateral position) is calculated based on the positional information of the target object read in step S500, as is the case with the process of step S202 illustrated in FIG. 2.

In step S506, a reliability level of the detected target object is calculated based on the distance change manner (i.e., the differential between the current value and the previous value of the position of the target object with respect to the host vehicle) calculated in step S502. The reliability level may be calculated such that the smaller the alienation between the differential between the current value and the previous value of the position of the target object with respect to the host vehicle, and the change rate of the position of the target object from the vehicle speed of the host vehicle, the higher the reliability level becomes. In other words, the reliability level may be calculated such that the greater the distance variation becomes, the lower the reliability level becomes. This is because, if the alienation between the differential between the current value and the previous value of the position of the target object with respect to the host vehicle, and the change rate of the position of the target object from the vehicle speed of the host vehicle is great, the probability that the object, that is to be detected, is detected, is high, and thus it can be determined that the reliability level of the positional information (distance) of the target object is low. The reliability level may be calculated such that it decreases linearly with respect to the increase of the alienation, or such that it decreases nonlinearly (step wise manner) with respect to the increase of the alienation.

It is noted that the comparison result in step S506 at the previous cycles may be considered to calculate the reliability level. For example, the alienation between the differential between the previous value and the further previous value of the position of the target object with respect to the host vehicle, and the change rate of the position of the target object from the vehicle speed of the host vehicle at the previous cycle, the alienation at further previous cycle, etc., may be considered. In this case, the reliability level may be calculated such that the smaller the average of the alienations becomes, the higher the reliability level becomes.

In step S508, the collision probability is calculated based on the movement vector calculated in step S504 and the reliability level calculated in step S506. The way of calculating the collision probability may be the same as described above. For example, when the movement vector calculated in step S504 has a direction to the host vehicle, the collision probability may be calculated such that the higher the reliability level calculated in step S506 is, the higher the collision probability becomes. Further, the collision probability may be calculated on a portion basis, as described above with reference to FIG. 4.

Figure 6:
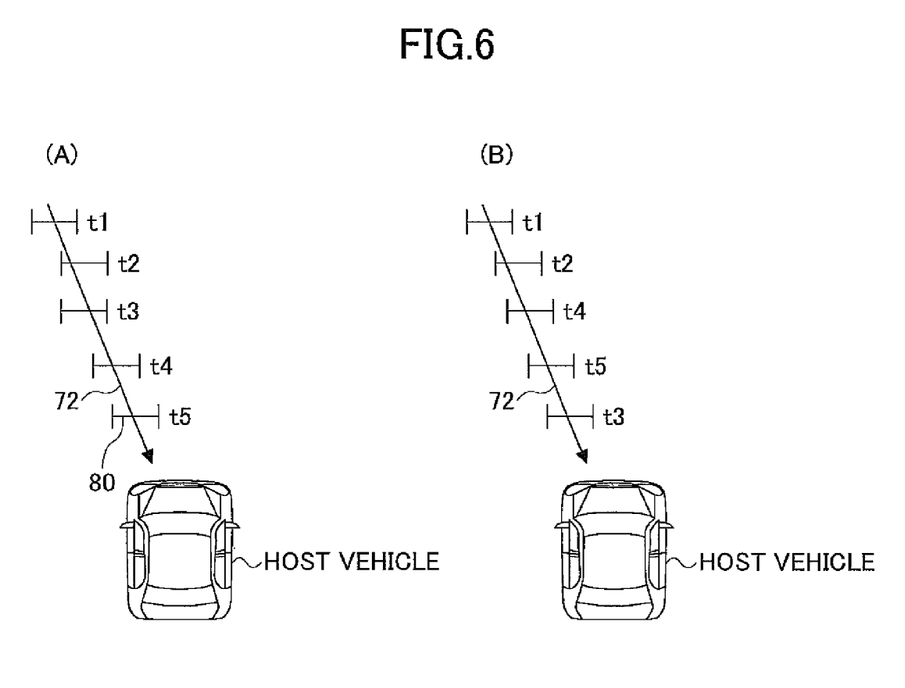
FIG. 6 is a diagram for illustrating another example of a reliability calculation algorithm in connection with a process of step S506 illustrated in FIG. 5.

FIG. 6 is a diagram for illustrating another example of the reliability calculation algorithm in connection with a process of step S506 illustrated in FIG. 5. In FIG. 6, t1 through t5 represent the obtainment time points (cycles) of the positional information of the target object, and a direction from t1 to t5 corresponds to a direction of the lapse of time. Marks indicated by a reference numeral 80 represents the target object detected points at the respective time points.

The reliability level may be calculated based on the change manner of the position itself of the target object with respect to the host vehicle. For example, as schematically illustrated in FIG. 6 (B), if the position of the target object with respect to the host vehicle becomes farther with respect to the previous cycle (i.e., the distance of the target object with respect to the host vehicle becomes longer), a low reliability level may be calculated. Specifically, in the example illustrated in FIG. 6 (A), the position of the target object with respect to the host vehicle becomes closer according to the lapse of time. In contrast, in the example illustrated in FIG. 6 (B), the position of the target object with respect to the host vehicle becomes farther at time point t4 after the position of the target object with respect to the host vehicle becomes the closest at time point t3. If the distance of the target object with respect to the host vehicle changes unstably, the probability that the object, which is not to be detected, is detected is high. For example, there is a probability that an object without material substance, such as smoke, a side wall (the side wall when the vehicle cannot crash into it), etc., is detected. Thus, if the distance of the target object with respect to the host vehicle changes unstably (i.e., if the distance change is great), the reliability level may be calculated such that it becomes lower than the reliability level to be calculated in the case where the distance changes stably as the example illustrated in FIG. 6 (A). It is noted that the positional information (collision lateral positions) of the target object used to determine such a stableness of the distance may be only the positional information that is adopted in calculating the movement vector in step S504, or may include the positional information of the target object (i.e., outliers) that is not adopted.

According to the second embodiment illustrated in FIG. 5 and FIG. 6, the collision probability is calculated based on the reliability level calculated according to the distance change manner as described above, which enables calculating the collision probability that is adapted more to the actual collision probability. In other words, if the distance change manner is great (unstable), a low reliability level is calculated and thus a low collision probability is calculated, which enables preventing the problem that a high collision probability is calculated with respect to the object that is not to be detected.

It is noted that the second embodiment described above may be combined with the first embodiment described above. Specifically, the reliability level may be calculated based on the distance change manner described above as well as the number (adopted point number) of the positional information items of the target object adopted in calculating the movement vector in step S504. For example, a resultant reliability level may be obtained by assigning predetermined weights to the reliability level based on the distance change manner and the reliability level based on the adopted point number, and totaling the weighted reliability levels. Alternatively, the reliability level obtained based on the adopted point number may be corrected based on the reliability level obtained based on the distance change manner.

Figure 7:
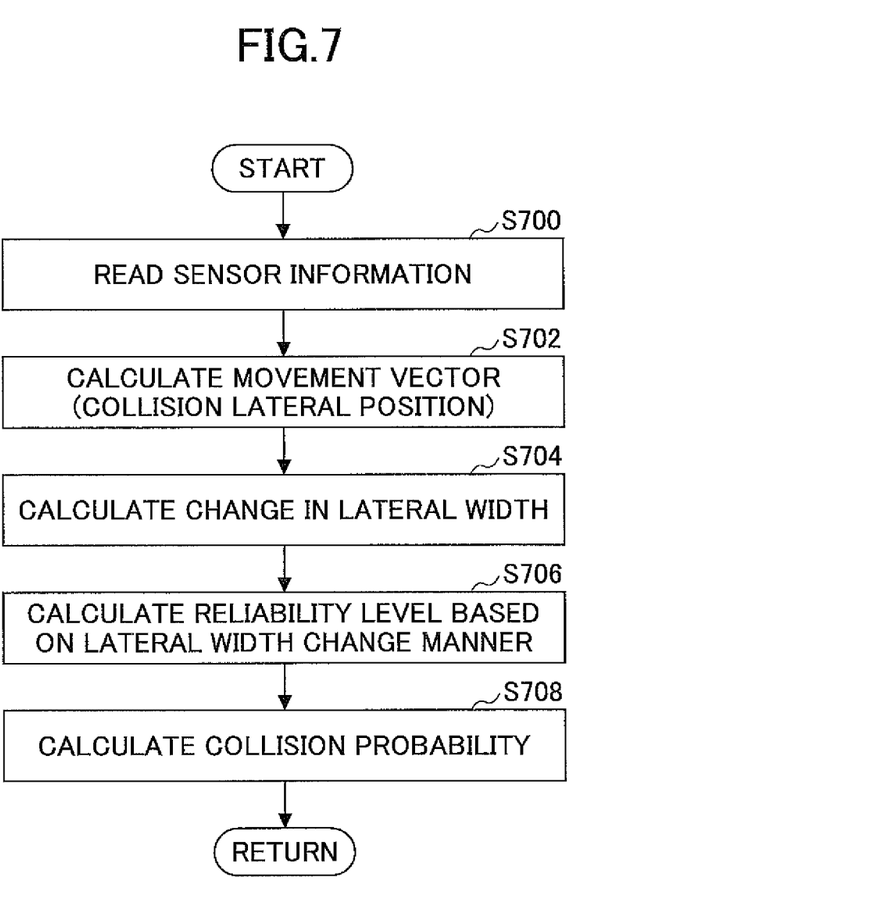
FIG. 7 is an example (third embodiment) of a flowchart of a main process executed by the collision prediction apparatus 1.

FIG. 7 is an example (third embodiment) of a flowchart of a main process executed by the collision prediction apparatus 1. It is noted that the process illustrated in FIG. 7 is performed by the processing device 10; however, a part of the processes (a process of step S702, etc., for example) may be performed by processing devices in the radar sensor 20 and/or the image sensor 30. In this case, processing devices in the radar sensor 20 and/or the image sensor 30 form a part of the processing device 10. The process routine illustrated in FIG. 7 is performed at a predetermined cycle during a period in which the vehicle travels, for example.

In step S700, the sensor information (the positional information and the lateral width information of the target object) from the radar sensor 20 and/or the image sensor 30 is read.

In step S504, the movement vector (and the collision lateral position) is calculated based on the positional information of the target object read in step S700, as is the case with the process of step S202 illustrated in FIG. 2.

In step S704, a change manner of the lateral width is calculated based on the lateral width information read in step S700. The change manner of the lateral width may be calculated based on the lateral width information obtained at the previous cycles. For example, a statistical value such as a variance of the lateral width may be calculated based on the lateral width information obtained at the latest 10 time points. It is noted that the lateral width information of the target object used in calculating the change manner of the lateral width may include only the lateral width information at the time points for which the positional information of the target object is adopted in calculating the movement vector, or may include the lateral width information of the target object at the time points for which the positional information of the target object is not adopted (i.e., the lateral width information of the target object at the time points for which the positional information items of the target object are determined as outliers).

Step S706, the reliability level of the detected target object is calculated based on the change manner of the lateral width calculated in step S704. In this case, the reliability level may be calculated such that the smaller the change manner of the lateral width becomes, the higher the reliability level becomes. This is because, if the change manner of the lateral width is great, it can be determined that the reliability level of the target object is low (there is a probability that the object, that is to be detected, is detected, or a reliability level related to consistency of the target object is low). The reliability level may be calculated such that it decreases linearly with respect to the increase of the change manner of the lateral width, or such that it decreases nonlinearly (step wise manner) with respect to the increase of the change manner of the lateral width.

In step S708, the collision probability is calculated based on the movement vector calculated in step S702 and the reliability level calculated in step S706. The way of calculating the collision probability may be the same as described above. For example, when the movement vector calculated in step S702 has a direction to the host vehicle, the collision probability may be calculated such that the higher the reliability level calculated in step S706 is, the higher the collision probability becomes. Further, the collision probability may be calculated on a portion basis, as described above with reference to FIG. 4.

Figure 8:
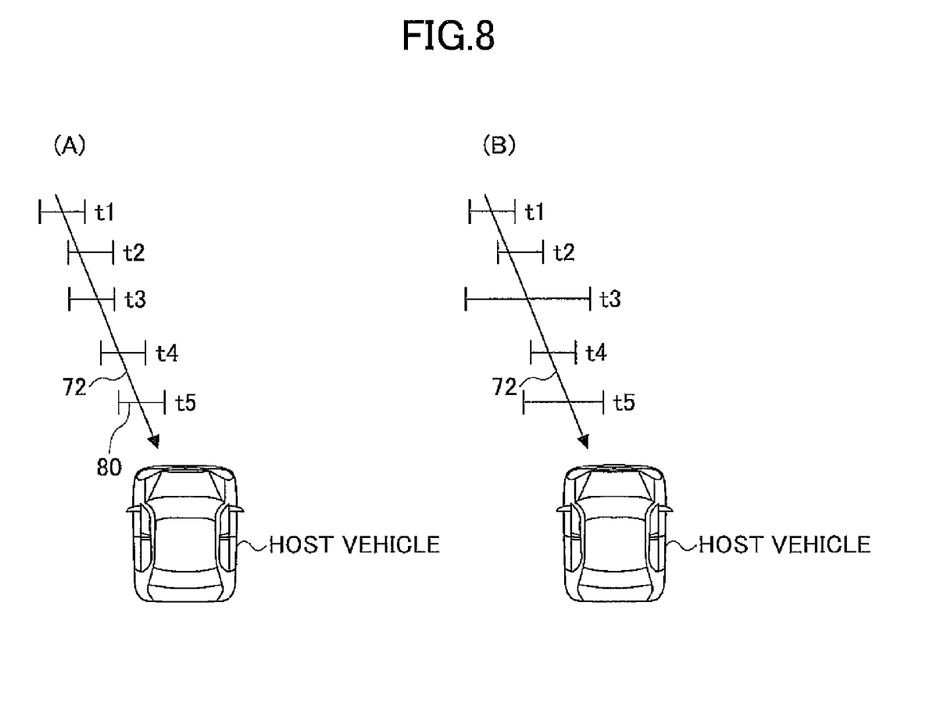
FIG. 8 is a diagram for illustrating another example of a reliability calculation algorithm based on a lateral width changing manner in connection with a process of step 5706 illustrated in FIG. 7.

FIG. 8 is a diagram for illustrating another example of the reliability calculation algorithm based on a lateral width changing manner in connection with a process of step S706 illustrated in FIG. 7. In FIG. 6, t1 through t5 represent the obtainment time points (cycles) of the positional information of the target object, and a direction from t1 to t5 corresponds to a direction of the lapse of time. Marks indicated by a reference numeral 80 represents the positions of the target object detected points at the respective time points. The width of the mark 80 corresponds to the lateral width of the target object based on the lateral width information (i.e., the width of the group of the target object detected points).

In the example illustrated in FIG. 8 (A), the change manner of the lateral width between the time points t1 through t5 is small. If the change manner of the lateral width is small as described above, a probability that the target object to be detected is detected with high accuracy is high. In contrast, in the example illustrated in FIG. 8 (B), the change manner of the lateral width between the time points t1 through t5 is great. Specifically, the width of the target object detected point group detected at time point t3 is substantially wider than those of the target object detected point groups detected at time points t1 and t2. Further, the width of the target object detected point group detected at time point t4 is substantially the same as those of the target object detected point groups detected at time points t1 and t2; however, the width of the target object detected point group detected at time point t5 is substantially wider than that of the target object detected point group detected at time point t4. If the change manner of the lateral width is thus great, a probability that the target object, which is not to be detected, is detected is high. For example, there is a probability that such an object without material substance, such as smoke. Thus, if the lateral width changes unstably, the reliability level may be calculated such that it becomes lower than the reliability level to be calculated in the case where the lateral width changes stably as the example illustrated in FIG. 6 (A).

According to the third embodiment illustrated in FIG. 7 and FIG. 8, the collision probability is calculated based on the reliability level calculated according to the change manner of the lateral width as described above, which enables calculating the collision probability that is adapted more to the actual collision probability. In other words, if the change manner of the lateral width is great, a low reliability level is calculated and thus a low collision probability is calculated, which enables preventing the problem that a high collision probability is calculated with respect to the object that is not to be detected.

It is noted that, in the third embodiment, in order to consider the lateral width of the target object, left ends of groups of the target object detected points at a plurality of time points may be linearly approximated with the RANSAC algorithm to obtain the movement vector, and right ends of groups of the target object detected points at a plurality of time points may be linearly approximated with the RANSAC algorithm to obtain the movement vector. In this case, the change of the width of the target object detected point groups may have an influence on the adopted point number (or the non-adopted point number) in calculating the movement vector related to the target object detected points at the left end, and the adopted point number (or the non-adopted point number) in calculating the movement vector related to the target object detected points at the right end. Thus, the change of the width of the target object detected point groups may be determined based on these adopted point numbers. Further, the change of the width of the target object detected point groups may have an influence on a parallelism between the movement vector related to the target object detected points at the center position, the movement vector related to the target object detected points at the left end, and the movement vector related to the target object detected points at the right end. Thus, the change of the width of the target object detected point groups may be determined based on such a parallelism between these movement vectors.

Further, the third embodiment described above may be combined with the first embodiment described above. Specifically, the reliability level may be calculated based on the change manner of the lateral width described above as well as the number (adopted point number) of the positional information items of the target object adopted in calculating the movement vector in step S702. For example, a resultant reliability level may be obtained by assigning predetermined weights to the reliability level based on the change manner of the lateral width and the reliability level based on the adopted point number, and totaling the weighted reliability levels. Alternatively, the reliability level obtained based on the adopted point number may be corrected based on the reliability level obtained based on the change manner of the lateral width.

Figure 9:
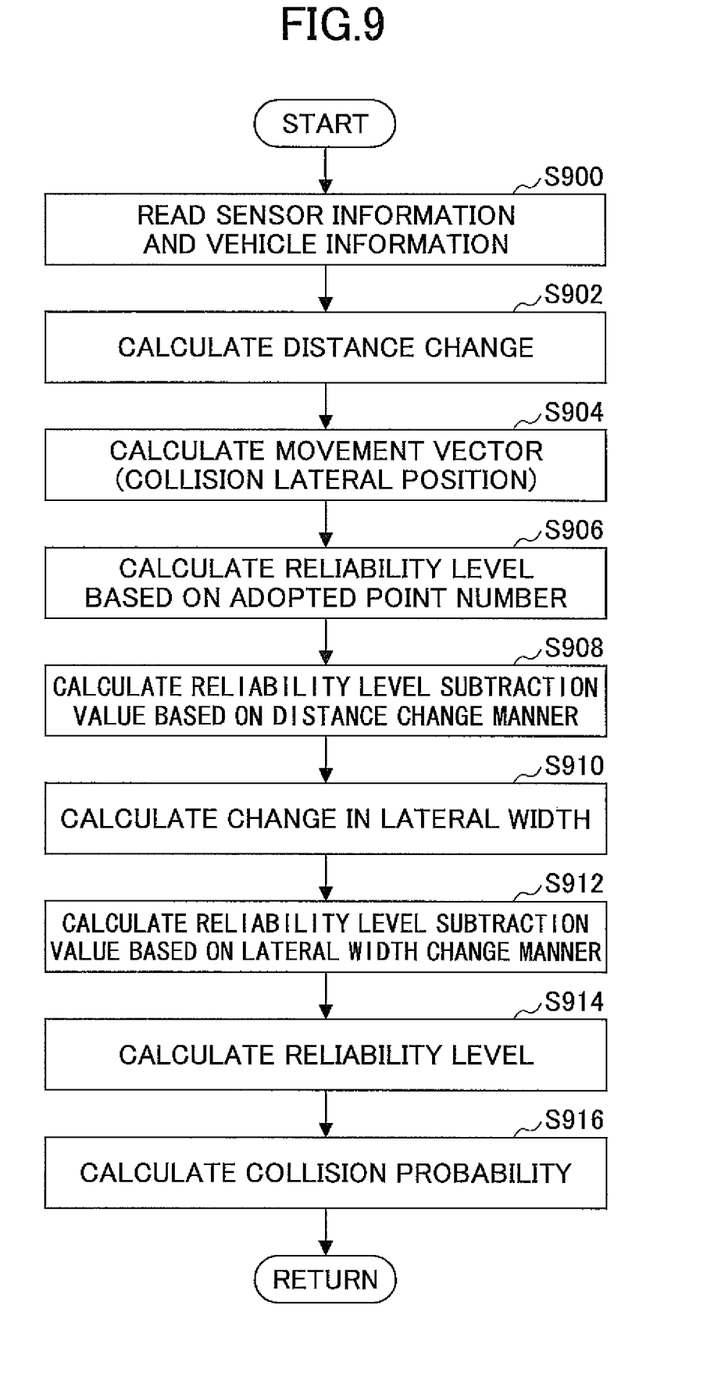
FIG. 9 is an example (fourth embodiment) of a flowchart of a main process executed by the collision prediction apparatus 1.

FIG. 9 is an example (fourth embodiment) of a flowchart of a main process executed by the collision prediction apparatus 1. It is noted that the process illustrated in FIG. 9 is performed by the processing device 10; however, a part of the processes (a process of step S904, etc., for example) may be performed by processing devices in the radar sensor 20 and/or the image sensor 30. In this case, processing devices in the radar sensor 20 and/or the image sensor 30 form a part of the processing device 10. The process routine illustrated in FIG. 9 is performed at a predetermined cycle during a period in which the vehicle travels, for example.

The fourth embodiment corresponds to an embodiment obtained by combining the first embodiment, the second embodiment and the third embodiment described above. In the followings, explanations to matters described above regarding the first embodiment, the second embodiment or the third embodiment are omitted, if appropriate. In step S900, sensor information, etc., from the radar sensor 20 and/or the image sensor 30 is read.

In step S902, the change rate of the position (distance) of the target object from the vehicle speed of the host vehicle is calculated, as is the case with step S502 described above with reference to FIG. 5 in the second embodiment.

In step S902, the movement vector (and the collision lateral position) is calculated, as is the case with step S502 described above with reference to FIG. 2 in the first embodiment.

In step S906, the reliability level related to the movement vector calculated in step S904 is calculated based on the number (adopted point number) of the positional information items of the target object adopted in calculating the movement vector in step S904, as is the case with step S204 described above with reference to FIG. 2 in the first embodiment.

In step S908, a reliability level subtraction value related to the distance change is calculated based on the distance change manner calculated in step S902. A way of calculating the reliability level subtraction value related to the distance change is basically the same as the way of calculating the reliability level in step S506 described above with reference to FIG. 5 in the second embodiment; however, the reliability level subtraction value is utilized as a "subtraction value" to reduce the reliability level, and thus the reliability level subtraction value is calculated such that it becomes greater as the distance change becomes greater.

In step S910, the change manner of the lateral width is calculated based on the lateral width information read in step S900, as is the case with step S704 described above with reference to FIG. 7 in the third embodiment.

In step S912, a reliability level subtraction value related to the change manner of the lateral width is calculated based on the change manner of the lateral width calculated in step S910. A way of calculating the reliability level subtraction value related to the lateral width change is basically based on the same idea used in step S706 described above with reference to FIG. 7 in the third embodiment; however, the reliability level subtraction value is utilized as a "subtraction value" to reduce the reliability level, and thus the reliability level subtraction value is calculated such that it becomes greater as the lateral width change becomes greater.

In step S914, a resultant reliability level is calculated based on the calculation results in step S906, step S908 and step S912. For example, a resultant reliability level may be derived by subtracting the respective reliability level subtraction values calculated in step S908 and step S912 from the reliability level calculated in step S906.

In step S916, the collision probability is calculated based on the movement vector calculated in step S904 and the reliability level calculated in step S914. The way of calculating the collision probability may be the same as described above. For example, when the movement vector calculated in step S904 has a direction to the host vehicle, the collision probability may be calculated such that the higher the reliability level calculated in step S914 is, the higher the collision probability becomes. Further, the collision probability may be calculated on a portion basis, as described above with reference to FIG. 4.

According to the fourth embodiment, the collision probability is calculated based on the adopted point number in calculating the movement vector with the linear approximation; the distance change manner; and the change manner of the lateral width, which enables calculating the collision probability that is adapted more to the actual collision probability.

Thus, it becomes possible to prevent the problem that a high collision probability is calculated with respect to the object that is not to be detected.

The present invention is disclosed with reference to the preferred embodiments. However, it should be understood that the present invention is not limited to the above-described embodiments, and variations and modifications may be made without departing from the scope of the present invention.

For example, the embodiments described above is related to the collision between the host vehicle and the target object in front of the host vehicle; however, the collision manner is not limited to such a front collision, and the essence of the embodiments described above (the ways of predicting the collision probability between the target object and the host vehicle, in particular) can be applied to any collision manners. For example, with respect to the collision into a rear part of the host vehicle, a radar sensor and/or an image sensor for monitoring the rear scene of the host vehicle may be used.

Further, the movement vector (linear movement trajectory) of the target object with the linear approximation is calculated as a movement trajectory of the target object; however, the movement trajectory (curve) of the target object may be calculated with the curve fitting.

Further, according to the first embodiment, etc., the linear approximation with the RANSAC algorithm is performed, and the reliability level is calculated based on the adopted point number at the time of the linear approximation; however, the linear approximation may be performed with the ordinary least squares method, instead of the RANSAC algorithm. In this case, the reliability level may be calculated such that the more the sampling point number becomes, the higher the reliability level becomes, considering such a tendency that the ordinary least squares method generally has.

Further, according to the first embodiment, etc., the linear approximation with the RANSAC algorithm is performed, and the reliability level is calculated based on the adopted point number at the time of the linear approximation; however, as an equivalent embodiment, the reliability level may be calculated based on the non-adopted point number. In this case, the reliability level may be calculated such that the less the non-adopted point number becomes, the lower the reliability level becomes. It is noted that considering the non-adopted point number is equal to considering the number that is obtained by subtracting the adopted point number from the total point number, and thus it is included in considering the adopted point number. Further, considering the adopted point number includes considering a ratio of the adopted point number to the total number, a differential between the adopted point number and the total number, etc.

Further, according to the embodiments described above, the reliability level is calculated based on parameters such as the adopted point number, etc. However, the reliability level may be calculated based on other parameters in addition to the parameters described above. For example, the reliability level calculated based on the parameters such as the adopted point number, etc., may be corrected according to a reception strength of the radar sensor 20 or a recognition reliability level of the image sensor 30 (a reliability level at the pattern matching, for example).

Further, according to the embodiments described above, the collision probability (or the accumulated value of the collision probabilities, the same holds true hereinafter) corrected based on the reliability level is compared to the threshold to determine whether the collision is inevitable; however, the reliability level and the collision probability may be evaluated independently. Specifically, if the reliability level is greater than or equal to a predetermined preference value and the collision probability is greater than or equal to a predetermined threshold, it may be determined that the collision is inevitable (which causes the brake control device 52, etc., to operate).

Further, according to the embodiments described above, the reliability level is calculated based on the parameters such as the adopted point number, etc., and the collision probability based on the movement vector is changed (corrected) based on the calculated reliability level; however, as an equivalent embodiment, the collision probability may be directly calculated based on the movement vector and the adopted point number, etc. Further, as an equivalent embodiment, the threshold to be compared with the collision probability may be corrected based on the calculated reliability level. In this case, the threshold may be corrected such that the threshold becomes closer to a nominal value as the calculated reliability level becomes higher, and the threshold becomes greater with respect to the nominal value as the calculated reliability level becomes lower.

The invention claimed is:

1. A collision prediction apparatus, comprising:
a sensor that obtains positional information representing a position of a target object with respect to a host vehicle; and
a processor, wherein
the processor calculates a movement trajectory of the target object with respect to the host vehicle, based on the positional information obtained at a plurality of time points by the sensor, the movement trajectory being calculated using a linear approximation that excludes outliers, the outliers being positional information outside of a predetermined error range,
the processor predicts a probability of a collision between the target object and the host vehicle, based on the calculated movement trajectory and at least one of three parameters, wherein the three parameters include a number of obtainment time points of the positional information used to calculate the movement trajectory, a change in a lateral width of the target object between the time points, and a change in the positional information of the target object with respect to the host vehicle in a longitudinal direction of the host vehicle,
the at least one of three parameters including the number of obtainment time points such that the predicted probability of a collision becomes lower as the number of the obtainment time points becomes smaller,
the at least one of three parameters including the change in the lateral width of the target object between the time points such that the predicted probability of a collision becomes lower as the change in the lateral width between the time points becomes greater, and
the processor issues an instruction to control a control target device based on the predicted probability of a collision.

2. The collision prediction apparatus of claim 1, wherein the processor predicts the probability of a collision based on the calculated movement trajectory and the change in the positional information of the target object with respect to the host vehicle in a longitudinal direction of the host vehicle such that the predicted probability of a collision becomes lower in a state where there is an alienation between the change in the positional information and a change in the position of the host vehicle calculated based on a vehicle speed sensor.

3. The collision prediction apparatus of claim 1, wherein the processor predicts the probability of a collision based on the calculated movement trajectory and the change in the positional information of the target object with respect to the host vehicle in a longitudinal direction of the host vehicle such that the predicted probability of a collision becomes lower in a state where the position of the target object with respect to the host vehicle becomes farther with respect to the previous position of the target object.

4. The collision prediction apparatus of claim 1, wherein the processor calculates the movement trajectory by a RANSAC algorithm.

5. The collision prediction apparatus of claim 1, wherein the processor predicts, for respective portions of the host vehicle, the probability of a collision between the target object and the portion of the host vehicle.

* * * * *